TRIGGER CIRCUIT FOR INDUCTIVE LOAD

Filed Oct. 21, 1965

INVENTOR.
PAUL W. CAULIER
EARLE B. McDOWELL
BY W. J. Shanley Jr.
THEIR ATTORNEY

INVENTOR.
PAUL W. CAULIER
EARLE B. MC DOWELL
BY W. J. Shanley, Jr.
THEIR ATTORNEY 3,436,608
TRIGGER CIRCUIT FOR INDUCTIVE LOAD
Paul W. Caulier, Greenwood, and Earle B. McDowell, Waynesboro, Va., assignors to General Electric Company, a corporation of New York
Filed Oct. 21, 1965, Ser. No. 499,769
Int. Cl. H01h 47/32
U.S. Cl. 317—148.5 4 Claims

ABSTRACT OF THE DISCLOSURE

The slow response time of a regenerative two transistor snap-action switch having an inductive load is overcome by energy storage. An RC network charges during switch off time to supply energy at turn-on to insure snap-action. The RC network also limits current flow into the first transistor during switch on time to prevent premature turn-off.

The present invention relates to switching circuits of the kind having a snap switching action in response to a varying signal and suitable for use with an inductive load.

The two transistor emitter-coupled bistable regenerative switch, often referred to as a Schmitt trigger, is a snap-action switch which develops a voltage switching differential to establish conduction and nonconduction switching thresholds for response to a slowly varying input signal. When such a switch is used with an inductive load, difficulties are encountered especially when the input voltage contains an AC component. In this situation, when the switch is turned on in response to the input voltage reaching a first amplitude, the load current builds up slowly due to the inductance. Since the threshold levels or the switching voltage differential is dependent upon the amount of load current flowing, the initial differential is small and increases with time to a final steady-state value. Thus, an AC component in the input voltage of sufficient amplitude to exceed this initially small switching voltage differential will cause the switch to turn off and then on at the frequency of the AC signal until the differential has become greater than the amplitude of the superimposed signal.

It is, accordingly, an object of the present invention to provide a snap-action switch having an inductive load that is free from the deleterious effects of such a load.

Another object of this invention is to provide means for sustaining the switching voltage differential of a snap-action switch having an inductive load.

These objects are realized in one embodiment of the invention by the addition of a resistor-capacitor network to the switch. This network is charged by the load current when the switch turns off, the charge then being available for immediate use at turn-on. Because the switching voltage differential is a function of the load current flowing, the current supplied to the switch by the resistor-capacitor network maintains the switching voltage differential at substantially full load current level until that current builds up.

The invention will become more fully apparent and better understood from the following description of an embodiment of the invention selected by way of example as illustrated in the drawings, in which.

Figure 1:
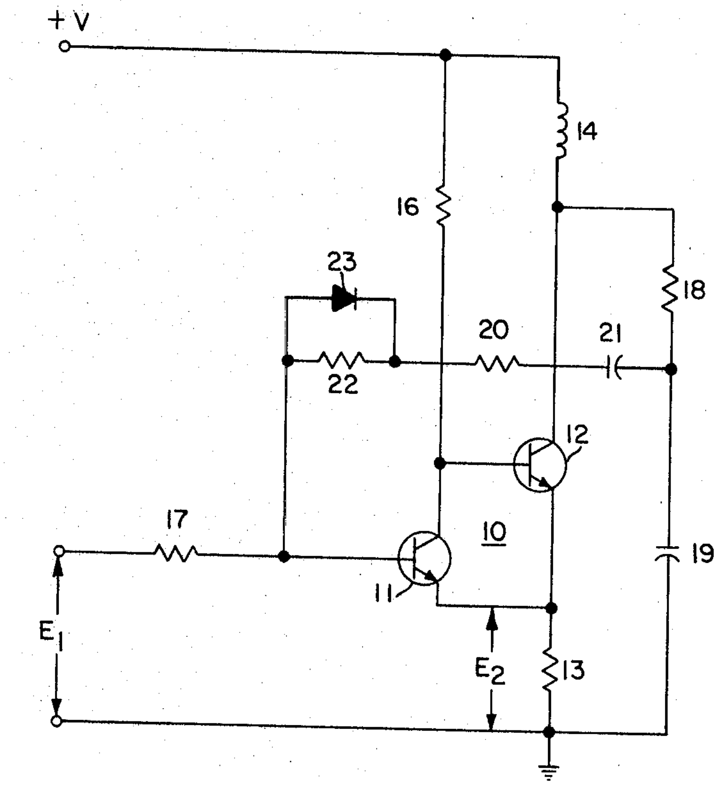
FIGURE 1 is a schematic diagram of the switching circuit with voltage feedback.

Referring now to the drawings, there is shown in FIGURE 1 a two transistor emitter-coupled switch 10, consisting of transistors 11 and 12. Transistor 12 with its emitter resistor 13 is shown connecting inductive load 14 across the power source which is indicated by +V and ground. The conduction of transistor 12 is controlled by transistor 11 in response to a varying input voltage $E_1$ which is applied to the base terminal of this transistor through resistor 17. Transistor 11 has its collector directly coupled to the base of transistor 12 while the emitters of the transistors are coupled together. Resistor 16, coupled between source +V and the base of transistor 12 serves to bias this transistor on when transistor 11 is not conducting. Resistor 16 is also the collector resistor of transistor 11, thus when transistor 11 is on current flows through resistor 16, transistor 11 and resistor 13 to ground. At this time, the voltage $E_2$ across resistor 13 fixes the voltage required to turn on switch 10. As the input voltage $E_1$ drops below that necessary to maintain transistor 11 conducting, the current from resistor 16 is no longer diverted and begins to flow through transistor 12 thereby raising the voltage across emitter resistor 13 which, in turn, further increases the back bias across the base-emitter junction of transistor 11 to instantly turn this transistor off, thus providing for the snap action turn-on of transistor 12.

If the switch 10 controls the power to a resistive load instead of to the inductor 14, full load current immediately flows through transistor 12 in response to the turning on of this device and the voltage $E_2$ immediately rises to a level determined by resistor 13 and the load current flowing. Whenever the varying input voltage $E_1$ should rise to exceed the amplitude of the voltage $E_2$, transistor 11 will again conduct, diverting current from the base of transistor 12 which causes the voltage $E_2$ to drop and results in a stronger forward bias across transistor 11 and a snap-action turnoff of the switch. With a resistive load, therefore, it is seen that this bistable regenerative switch is fast acting and maintains a switching voltage differential which is constant for the conduction period of the switch.

Figure 2:
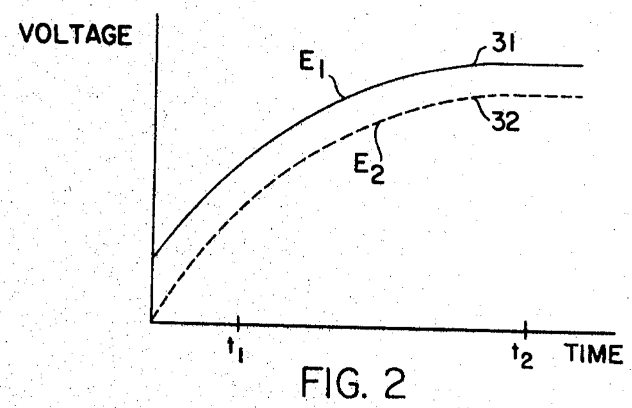
FIGURE 2 illustrates the switching voltage differential without energy storage.

If switch 10 controls the power to an inductive load, the rise of current at turnon is gradual and the switching voltage differential represented by the voltage across the emitter resistor slowly builds up as is shown in FIGURE 2. Dashed line 32 in this figure shows the voltage $E_2$ building up from zero (a nominal figure representing the off voltage across this resistor when there is no current flowing) to a maximum value at time $t_2$ when full load current is flowing. The voltage $E_1$ required to turn the switch off is shown by solid line 31. The displacement between curves 31 and 32 is substantially constant, representing the base-emitter voltage drop of transistor 11 and the IR drop across resistor 17. Thus the voltage $E_1$ required at any instant to change switch 10 from a conducting state to a nonconducting state is the voltage $E_2$ plus the above-mentioned voltage drops and constitutes the switching voltage differential. This differential is low immediately after turnon and increases slowly due to the inductive load. Because of this, any changes in the varying input voltage in excess of the switching voltage differential, i.e., $E_1$ at time $t_1$, for example, will cause the switch to turn off. This turnoff is premature and thus undesirable if caused by spurious voltages contained within the input signal such as an AC ripple.

To remedy premature turnoff and to establish the large switching voltage differential that is experienced when full load current is flowing, such as is noted at time $t_2$, an energy storage circuit is added to the switch. This energy storing means may consist of a single resistor and capacitor such as the resistor 18 and capacitor 19, shown in FIGURE 1. Coupled across transistor 12, this circuit supplies current to the transistor and emitter resistor 13 to immediately establish a large switching differential at turn-on. The value of resistor 18 and capacitor 19 is a compromise controlled by several factors. It is desired that the capacitor be large to maintain the large switching voltage differential at turnon and also to limit the voltage across transistor 12 at turnoff yet the value of capacitor 19 may not be so large as to extend the switch turnon time. It is desired that resistor 18 be large to sustain the energy applied to transistor 12 until the load current builds up. The size of this component, however, must be limited to prevent an increase in the decay time of the load current at turnoff and also to keep from reducing the protection capacitor 19 affords transistor 12 at turnoff.

Figure 3:
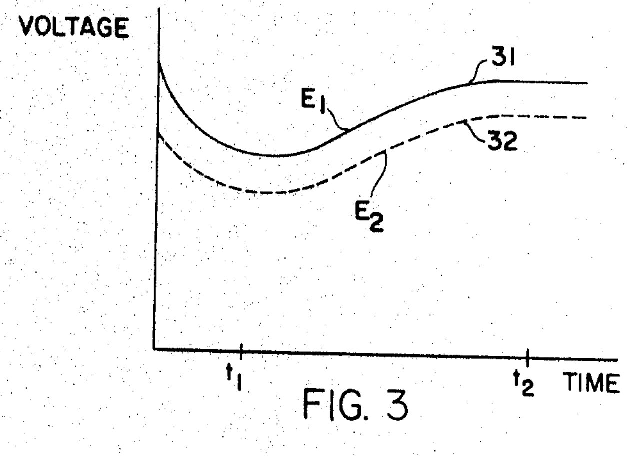
FIGURES 3 and 4 illustrate the switching voltage differential of the switch with energy storage.
Figure 4:
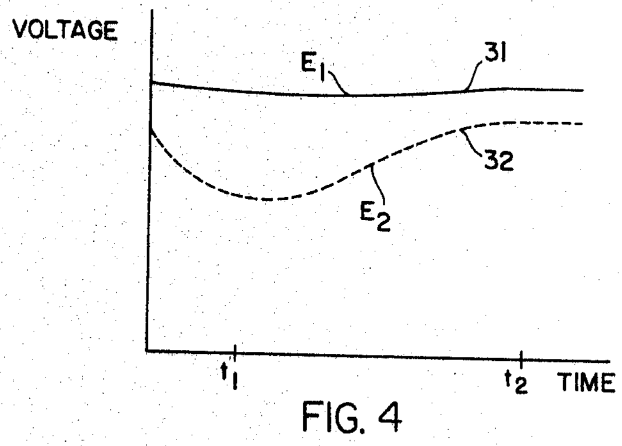

The effect of adding a single resistor-capacitor circuit to the switch is shown in FIGURE 3. When the switch is turned on at time zero, current is immediately supplied to transistor 12 and the voltage necessary to trigger the switch off, e.g., the switching voltage differential, is initially as large as the switching voltage required at time $t_2$, when the load current has built up to its steady-state value. It is noted, however, that because capacitor 19 and resistor 18 are limited in value, as noted above, the switching voltage differential (as indicated by curve 31) drops from its initial high at time zero as the charge on the capacitor dissipates through the resistor 18 and transistor 12.

FIGURE 1 further shows a resistor 20 and capacitor 21 coupled in series to the base electrode of transistor 11 and to the point of connection of the transistor 12 with the inductive load 14 by resistor 18. This second resistor-capacitor circuit forms a part of the energy storage circuit and serves to remove the effects of the limited size of capacitor 19 and resistor 18. Capacitor 21 is directly connected to capacitor 19 and is charged by the load current at turnoff. When transistor 12 is turned on there is initial current flow from capacitor 19 through capacitor 21 and resistors 20 and 17 to the source $E_1$, ignoring resistor 22 and diode 23 for the moment. As the charge on capacitor 19 decreases the current flow reverses and the source $E_1$ begins to supply current to this resistor-capacitor circuit. During this interval, the voltage $E_1$ required to turn switch 10 off at any instant is increased by the amount of the voltage drop across resistor 17 above the level of $E_2$, as shown in FIGURE 5. By appropriately selecting the values of resistor 20 and capacitor 21, the characteristic of the current flowing through resistor 17 can be made to compensate for the dip in the switching voltage differential, thus providing a substantially constant differential throughout the conduction cycle of the switch.

It should be noted that while FIGURE 1 shows the second resistor-capacitor circuit connected to the point of interconnection of resistor 18 and capacitor 19, this circuit may perform its function as readily if connected directly to the collector of transistor 12. The values of resistor 20 and capacitor 21 would be changed accordingly for such connection.

The addition of resistor 20 and capacitor 21 to the switching circuit provides not only a path for current to flow from the base of transistor 11 when switch 10 is conducting, a path is also provided for current to flow into the base of transistor 11 after turnoff, when the charge on capacitor 19 exceeds the voltage $E_1$. At this time, immediately after turnoff, when the charge on capacitor 19 is rapidly building up, if the input voltage should fall to the value where it is desired that the switch be turned on, the current flowing into the base of transistor 11 would require that an even lower voltage $E_1$ would be necessary to turn the switch on. To insure precision of operation in response to the predetermined levels of input voltage at which switching is desired, it may be necessary to correct for this temporary increase in the switch voltage differential. Accordingly, resistor 22 is connected in series with the second resistor-capacitor circuit. This resistor, substantially larger than resistor 20, limits the current flowing into the base of transistor 11 when capacitors 19 and 21 are charging. Resistor 22 is limited in maximum value to permit capacitor 21 to charge during the shortest off interval. Diode 23 is connected across resistor 22 and is polarized to permit current to flow away from the base of transistor 11 when the switch is on. Again, the parallel combination of resistor 22 and diode 23 only finds use in the instant where it is desired to turn switch 10 on immediately after turnoff when capacitor 19 is charging.

The concept of the present invention is the correction of the slow response time of a snap-action switch having an inductive load by supplying the switch with a source of energy whenever the inductive load fails to respond with the speed required. While this concept is described with reference to a single resistor-capacitor circuit and a more sophisticated resistive-capacitive network, it should be understood that these particular embodiments are chosen for the purpose of description and various changes and modifications may be made in the practice of the invention herein described without departing from the spirit or scope thereof. It is intended that the foregoing description shall be taken primarily by way of illustration and not in limitation except as may be required by the appended claims.

What is claimed and desired to be secured by Letters Patent of the United States is:

1. A snap-action switch circuit for an inductive load comprising a two transistor bistable regenerative switch, the first transistor of said switch being responsive to a varying input voltage and controlling the conduction of the second transistor, said second transistor being in series connection with said inductive load, said switch being turned on when said input voltage reaches a first amplitude and turned off when said input voltage reaches a second amplitude, energy storage means connected to said transistor switch at the point of connection with said inductive load, said energy storage means supplying current to said transistor switch when said varying input voltage reaches said first amplitude and until the load current builds up to a predetermined level, said energy storage means being charged by the load current when said transistor switch is turned off, said energy storage means comprising a first resistor and capacitor coupled in a series circuit across said second transistor and a second resistor and capacitor coupled in a series circuit between the electrode of said first transistor receiving said input voltage and said first resistor.

2. A snap-action switch circuit as recited in claim 1 wherein said energy storage means further includes a third resistor in series connection with said second resistor and capacitor, said third resistor being shunted by a rectifier oriented to provide a low impedance path for current flowing from the electrode of said first transistor receiving said input voltage.

3. A snap-action switch circuit for an inductive load, comprising a source of varying voltage, a two transistor emitter-coupled regenerative switch, the base of the first transistor coupled to receive said varying voltage, the second transistor being in series connection with said inductive load, feedback means coupled to said first and second transistors for establishing a switching voltage differential, said first transistor controlling the conduction of said second transistor in response to changes in amplitude of said varying voltage, said second transistor being turned on when said varying voltage reaches a first amplitude and turned off when said varying voltage reaches a second amplitude, the changes in said varying voltage between said first and second amplitudes being at least as great as said switching voltage differential, capacitive energy storage means coupled to said second transistor at the point of connection with said inductive load, said storage means supplying current to said second transistor when said varying voltage reaches said first amplitude to sustain said switching voltage differential until the load current builds up to a substantial level, said energy storage means being charged by the load current when said varying input voltage reaches said second amplitude.

4. A snap-action switch circuit for an inductive load comprising a source of varying voltage, a two transistor emitter-coupled regenerative switch, the base of the first transistor coupled to receive said varying voltage, the second transistor being in series connection with said inductive load, feedback means coupled to said first and second transistors for establishing a switching voltage differential, said first transistor controlling the conduction of said second transistor in response to changes in the amplitude of said varying voltage, said second transistor being turned on when said varying voltage reaches a first amplitude and turned off when said varying voltage reaches a second amplitude, the changes in said varying voltage between said first and second amplitudes being at least as great as said switching voltage differential, a first resistor and capacitor circuit coupled across said second transistor, a second resistor and capacitor circuit coupled between the base of said first transistor and said first resistor and capacitor circuit, said first and second resistor and capacitor circuits supplying current to said second transistor when said varying voltage reaches said first amplitude to maintain said switching voltage differential substantially constant when said second transistor is conducting, said second resistor and capacitor circuit providing a path to defer current from the base of said first transistor whenever the amplitude of said varying voltage exceeds the voltage across the capacitor of said first resistor and capacitor circuit, said first and second resistor and capacitor circuits being charged by the load current when said varying voltage reaches said second amplitude.

References Cited

UNITED STATES PATENTS

| | | | |
|---|---|---|---|
| 3,049,650 | 8/1962 | Greenblatt | 317—148.5 |
| 3,193,732 | 7/1965 | Jamieson et al. | |
| 3,241,779 | 3/1966 | Bray et al. | |

LEE T. HIX, *Primary Examiner.*

U.S. Cl. X.R.

307—253, 290